Oct. 4, 1955  G. A. BRACE  2,719,597
SUCTION CLEANERS AND FILTER ASSEMBLY THEREFOR
Filed Oct. 21, 1953  2 Sheets-Sheet 1

INVENTOR.
George A. Brace
BY Alfred G. Gross
ATTORNEY.

Oct. 4, 1955  G. A. BRACE  2,719,597
SUCTION CLEANERS AND FILTER ASSEMBLY THEREFOR
Filed Oct. 21, 1953  2 Sheets-Sheet 2
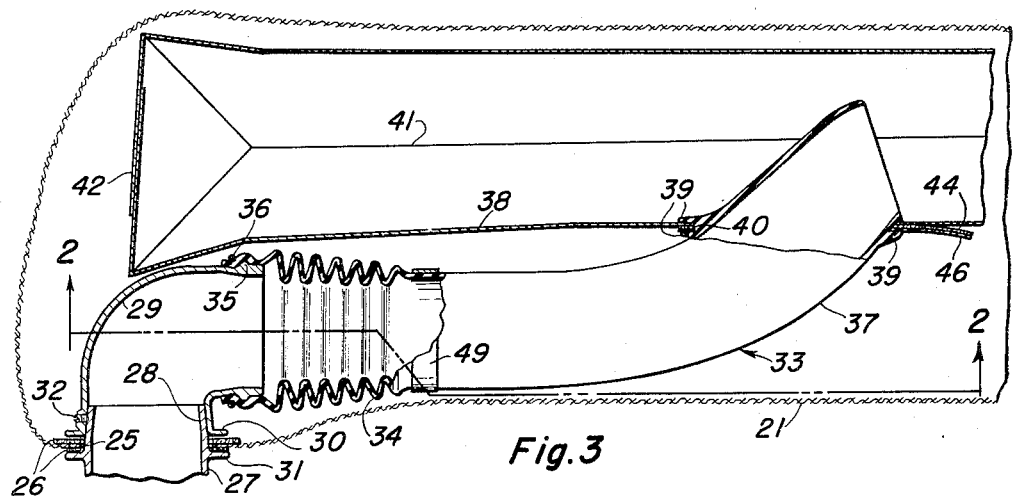
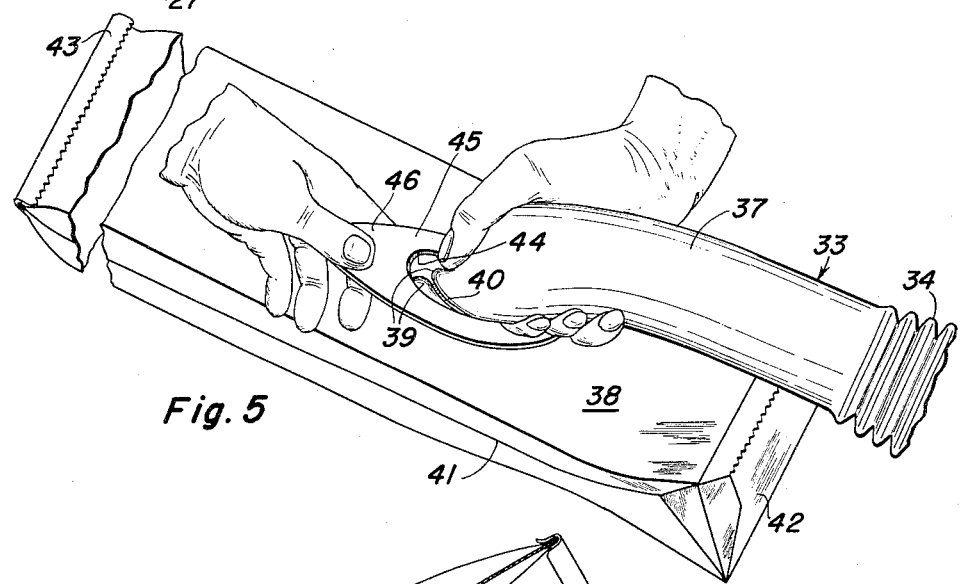
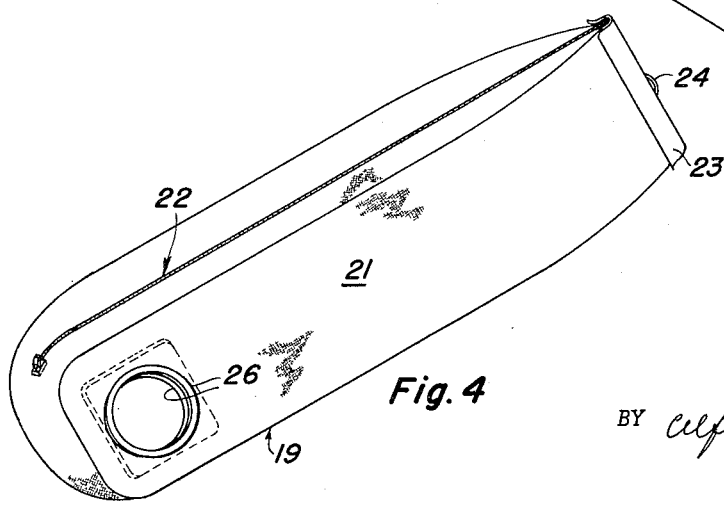
INVENTOR.
George A. Brace
BY Alfred G. Gross
ATTORNEY.

United States Patent Office 2,719,597
Patented Oct. 4, 1955

2,719,597

SUCTION CLEANERS AND FILTER ASSEMBLY THEREFOR

George A. Brace, Highland Park, Ill., assignor to The Hoover Company, North Canton, Ohio, a corporation of Ohio Application October 21, 1953, Serial No. 387,422

8 Claims. (Cl. 183—43)

This invention relates to suction cleaners and more particularly to a unique and simplified filter assembly therefor featuring a novel filter adapter especially designed for use with non-reusable paper filter receptacles.

The invention has particular utility with the upright type suction cleaner wherein the filter assembly is mounted beside the propelling handle and pivots therewith during the use of the cleaner. In such arrangements, it is essential to protect the easily ruptured paper filter against repeated flexing as the propelling handle pivots. Previously designed filter adapters intended to safeguard against this contingency have been unduly heavy and involve the use of complex filter bag constructions as well as complicated and unsatisfactory clamps for releasably coupling the adapter to the filter inlet.

The present invention provides an unusually simple combined adapter and automatic coupling designed to enter an inlet opening in the wall of the filter and to form an airtight joint with the rim of this opening thereby eliminating the need for the tubular type filter inlets now in common use. More specifically, the invention makes use of a self-expanding flexible adapter tube provided with an external seating groove near its outlet. It is assembled to the filter merely by collapsing the outlet end of the adapter and inserting the same into the filter inlet until the groove lies in the plane of the filter inlet and thereafter allowing the adapter to expand under its own resiliency leaving the rim of the filter inlet seated in the groove in an airtight manner. Preferably the filter inlet is located in the side wall of a tubular filter bag at a point intermediate the ends thereof. In consequence, the dirt collects in the bottom of the bag and out of the path of the incoming air stream. Moreover, this arrangement avoids flexure of the filter during the use of the cleaner since relative movement between the filter and the cleaner handle is absorbed by the long flexible adapter tube.

Accordingly, it is a prime object of the invention to provide a new and improved suction cleaner employing an inexpensive throw-away type filter and a simplified adapter for use therewith.

Another object is the provision of a combined filter adapter and automatic clamp for coupling the same directly to an opening through the wall of a paper filter.

Still another object is the provision of a new non-reusable paper filter.

Numerous other objects and advantages of the invention will become readily apparent from the following detailed specification of an illustrative embodiment of the invention taken in connection with the accompanying drawings, wherein:

Figure 3 is a similar view of the filter adapter and filter bag taken along line 3—3 on Figure 2;

Figure 4 is an isometric view of the filter assembly taken from the air inlet side of the assembly; and Figure 5 is a perspective view showing the filter bag in the process of being assembled to the adapter tube.

Figure 1:
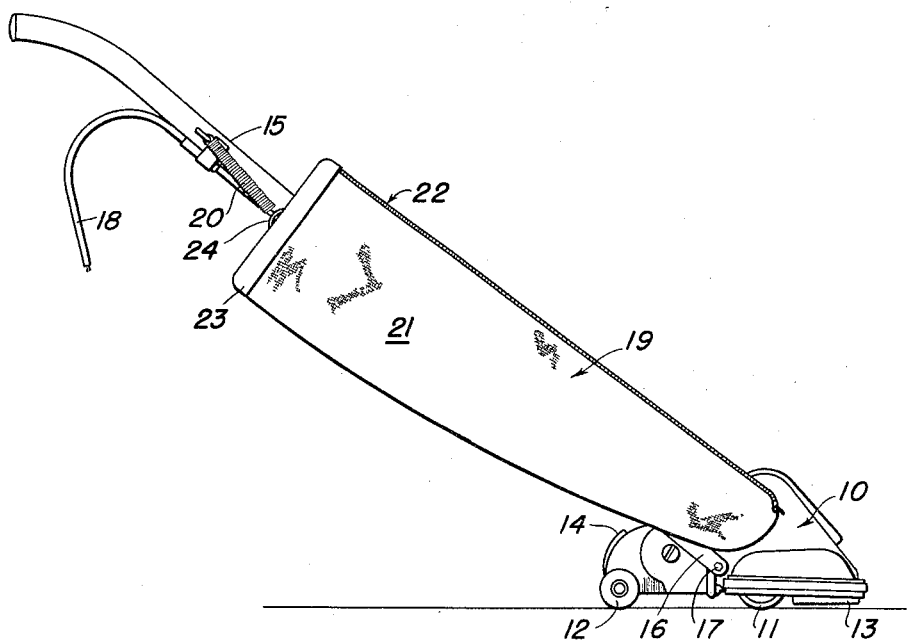
Figure 1 is a general side elevational view of a floor type suction cleaner incorporating the present invention.

Referring now to the drawings and particularly to Figure 1, it will be seen that a cleaner of a well known construction has a main body 10 supported on a pair of front carrier wheels 11 and a pair of rear wheels 12. A suction nozzle 13 extends across the forward end of the body and opens upwardly into a suction passageway leading to the inlet eye of a fan chamber not shown but lying in a plane extending crosswise of the body and at an angle to the vertical. The suction fan is driven by an electric motor housed within the rear end of the main body and controlled by a push button switch having a control button 14 at the rearmost end of the body.

A propelling handle 15 is provided with a bail 16 straddling the cleaner body and pivoted thereto at 17. The usual electric service cord 18 is attached to the upper end of the handle and extends downwardly and into the cleaner body in a well known manner. The filter assembly generally designated 19 extends lengthwise at one side of the handle. Its upper end is detachably connected to the handle by a tension spring 20. The inner lower side of the filter assembly is swively connected to the cleaner exhaust conduit in a manner which will be described in greater detail below.

Figure 2:
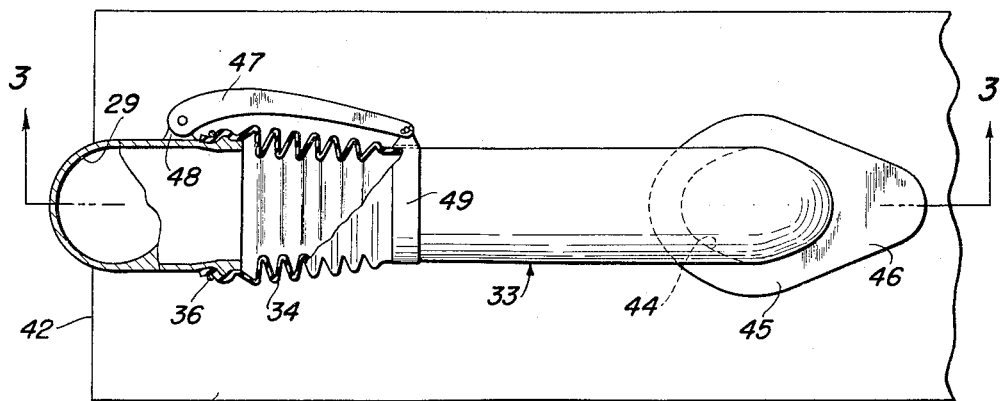
Figure 2 is a fragmentary side view partly in section of the filter adapter assembled to a paper filter and taken generally along the line 2—2 on Figure 3.

Referring now to Figures 2 to 4, it will be seen that the filter assembly includes an outer appearance bag of loosely woven fabric 21 having the general contour best illustrated in Figure 4. The interior of the appearance envelope is accessible through a hookless fastener 22 extending lengthwise of the envelope along the upper edge and preferably opening upwardly from the lower end of the envelope. The upper end of the envelope is permanently closed and provided with a supporting spring clip 23 having a hook 24 to which spring 20 may be connected. The lower inner side of the appearance bag has a circular inlet opening suitably reinforced by inner and outer stiffening rings 26 adapted to swively mount the inlet end of the envelope about the exhaust air conduit 27 projecting laterally from the fan chamber at one side of the cleaner body.

The outer end of the discharge conduit 27 has a tapered seat 28 for an elbow 29. The inlet end of the latter is provided with a flange 30 which cooperates with a flange 31 projecting from the outer wall of conduit 27 to hold rings 26 of the appearance envelope loosely in place on the end of conduit 27 in the manner clearly illustrated in Figure 3. Elbow 29 is secured in place on conduit 27 as by a set screw 32. From the foregoing it will be clear that the envelope is free to pivot on the outer end of the air discharge conduit as the cleaner propelling handle is pivoted between its vertical parked position and the normal inclined operating positions therebelow.

The filter adapter proper is generally designated 33. This adapter preferably is made of a single piece of soft rubber or suitable readily flexible and resilient plastic material. Its lower inlet end is of somewhat larger diameter than the upper end and includes the thin walled bellows like section 34 which seats over the exhaust end of elbow 29 and is locked in place behind a rib 35 thereon by means of a wire clamp 36.

The walls forming the upper end of the filter adapter may be somewhat thicker than those of the lower end so as not to flex so readily and so as to confine the major portion of the flexing to the bellows like lower end. The upper end 37 curves away from the cleaner handle slightly, as clearly illustrated in Figure 3, so as to project inwardly and upwardly into the paper filter bag 38. A pair of flanges 39 project outwardly in closely spaced relation from adapter 37 and lie in a substantially vertical plane at an angle to the axis of the adapter itself. These flanges form a narrow filter seating groove 40 within which the rim edges of the filter inlet seat snugly and in an airtight manner. As will be obvious from an inspection of Figures 2 and 3, the filter inlet opening should be elliptical in shape to conform in shape with seating groove 40. It will be understood however that the adapter may extend in the filter normally to a side or end wall thereof in which event groove 40 will be circular in shape to fit a similarly shaped filter inlet opening.

As best illustrated in Figure 5, my non-reusable paper filter bag 38 is preferably made in the shape of an elongated grocery sack having inwardly extending pleats 41 along its opposite sides and a flat bottom 42 at its lower end. The edges of the upper end 43 may be turned backwardly against the body of the bag and sealed thereto by glue or stitching. The filter inlet opening 44 is preferably formed in the flat side wall at a point intermediate the upper and lower ends of the filter. Glued in place over the marginal edges of opening 44 is a relatively stiff egg-shaped reinforcing member 45 having a finger tab 46 which is not glued to the underlying portion of the filter so that it can be readily grasped by the operator to facilitate the assembly and disassembly of the filter from the adapter.

As the filter bag becomes filled with dirt, it will collect in the bottom of the appearance envelope and sufficiently to collapse the bellows axially to an undesirable extent. It sometimes happens also that heavier dirt bulges the side walls of the bag to such an extent as to collapse the bellows inwardly and interfere with the proper flow of air through the adapter. Both of these conditions may be safeguarded against by a simple pivoting linkage of the type illustrated in Figure 2. This linkage comprises a link 47 having its lower end pivoted to a tab 48 carried by the upper side of elbow 29. The upper end of link 47 is likewise pivoted between the up-turned ends of a band 49 encircling the adapter at a point above bellows 34. Thus, it will be apparent that the linkage does not interfere with the pivoting and flexing of the bellows in a vertical plane but does prevent it from being shifted laterally toward the cleaner body. Band 49 also cooperates with link 47 in preventing the filter from collapsing the side wall of the bellows inwardly.

*Operation*

The operation of my cleaner will be quite apparent from the foregoing description of its construction. Let it be assumed that the operator wishes to install a throwaway paper filter bag on the cleaner. The first step is to open hookless fastener 22 in the appearance envelope to gain access to the filter adapter. The filter bags, as manufactured, are folded flat with the pleats 41 extending inwardly at the opposite edges of the bag and with the flat bottom folded against the flattened body. The operator grasps the finger tab 46 between the thumb and fingers of the left hand and inserts the bag into the appearance envelope bringing the inlet opening 44 opposite the upper end 37 of the adapter. The upper end of the adapter is then grasped in the right hand with the thumb lying along the upper side of the adapter at a point just below filter seating groove 40. The thumb is then pressed downwardly so as to collapse the discharge end of the adapter thereby greatly reducing the cross-sectional area of the adapter. While holding the adapter thus collapsed, the operator inserts the pointed end through the filter inlet until seating groove 40 lies in the plane of the filter inlet opening. The operator then relaxes his grasp of the adapter tube allowing it to expand under its own resiliency until the edge of the filter inlet seats firmly and in an airtight manner in groove 40.

Preferably the cross sectional area defined or enclosed by groove 40 is somewhat greater than the cross sectional area of the filter inlet with the result that the edge of the filter inlet is gripped very firmly and even distorted slightly in order to assure an airtight seal. Further assurance of a proper seal is had by flaring the inner sides of flanges 39 toward one another as they approach the base of the groove. In consequence, flanges 39 act to guide the rim of the filter inlet into the seat and the roots of the flanges grip the opposite rims of the filter inlet more snugly. All that remains is for the operator to close hookless fastener 22 and place the cleaner in operation in the usual manner.

The dirty air is exhausted into the adapter through conduit 27 and passes upwardly through the adapter into the upper portion of the filter bag. The separated dirt collects in the large area dirt collecting space at the bottom of the bag in an area entirely removed from the high velocity incoming air stream. As the cleaner handle is pivoted during the operation of the cleaner, it will be clear that the entire filter assembly pivots about the end of discharge conduit 27. Since the appearance envelope closely encircles the inflated paper filter bag, the latter will be constrained to pivot bodily with the appearance bag and any flexing will take place in the bellows portion 34 of the adapter rather than in the filter bag itself.

When the lower half of the filter becomes filled with dirt, it is desirable to replace the filter with a clean one. This is accomplished by opening the hookless fastener and detaching the filter adapter from the filter bag by depressing the upper wall of the collapsible adapter tube between the thumb and fingers of one hand as finger tab 46 is grasped with the other and removed from the end of the adapter. During this operation there is no tendency for dirt to spill from the bag since it remains collected at a point below the filter inlet. The upper end of the detached bag may then be folded downwardly against the dirt filled portion of the bag and carried to a place of disposal. A new bag is installed in the cleaner as described above.

From the foregoing it will be clear that my invention replaces the conventional multi-part filter adapter and clamping coupling with a single unitary adapter incorporating as an integral part thereof a self-expanding filter clamp. Moreover, this simple device suffices to form an airtight coupling with the inlet opening of a paper filter bag. It is unnecessary to provide the filter with a duct-like inlet tube or to form the filter in such a manner as to provide a tubular neck which telescopes over the adapter. Rather, all that is required is a paper filter bag having a mere inlet opening of the proper size and shape in any part thereof. This opening may or may not be reinforced although it is preferable to reinforce it as by a ring of paper glued thereto.

While I have shown and described but one embodiment of my invention, it is to be understood that this embodiment is to be taken as illustrative only and not in a limiting sense. I do not wish to be limited to the particular structure shown and described but to include all equivalent variations except as limited by the scope of the claims.

I claim:

1. In an upright suction cleaner a filter adapter assembly for said cleaner including a resilient flexible walled adapter conduit having an inlet end coupled to said exhaust air conduit and its exhaust end extending upwardly beside said propelling handle, the discharge end of said adapter having a narrow filter seating groove opening outwardly from the outer wall of said adapter and lying in a plane near the discharge end thereof, the opposite walls of said filter seating groove being adapted to embrace and seat snugly in engagement with the inner and outer rim edges of an opening through the wall of a paper filter bag when said rim edges are seated in said groove, and the walls of the discharge end of said adapter including said filter seating groove being collapsible toward one another to facilitate the insertion of said adapter into the inlet of a paper filter until the edges of the inlet lie in the plane of said groove whereby, upon the removal of the collapsing pressure on said adapter, the latter expands under its own resiliency until the edges of the filter inlet are snugly seated in said groove.

2. A filter adapter for use on an upright type suction cleaner, said adapter comprising a one piece tubular member made of resilient flexible material, the inlet end thereof having a bellows-like configuration whereby said adapter flexes freely in all directions extending crosswise of the axis of said adapter, the opposite outlet end of said adapter having a plurality of outwardly projecting closely spaced flanges forming a narrow filter seating grooves lying in a plane extending crosswise of said outlet end, said outlet end normally being fully expanded and resisting pressures tending to collapse the walls of the adapter toward one another, said groove being adapted to receive and snugly grip between said closely spaced flanges the rim edges of an inlet opening formed in the wall of a paper filter bag so as to hold the filter assembled to said adapter, the filter being readily insertable in and removable from said groove while the outlet end of the adapter is held partially collapsed by applying pressure radially to the opposite sides thereof at points inwardly from the outlet end thereof.

3. A filter assembly for use on an upright type suction cleaner, said assembly comprising an outer elongated tubular appearance envelope having an opening therealong for the insertion and removal of a filter bag, a flexible walled tubular filter adapter having its lower inlet end associated with an opening through the lower end of said appearance envelope, said adapter extending upwardly beside the inner side wall of said envelope and having a curved upper end adapted to project laterally through the side wall of a filter bag, an elongated tubular paper filter bag closed at its opposite ends and having an air inlet opening cut through the side wall thereof intermediate its ends, the upper end of said adapter having a narrow groove extending therearound having a circumferential length and shape corresponding to that of said filter inlet opening, surfaces of the groove being adapted to engage the rim edges of the air inlet opening in the filter bag when the bag is assembled on the filter adapter, the upper end of said adapter being formed of resilient flexible material so as to return to its normal shape and size immediately after a collapsing force is removed therefrom and being readily collapsible by pressure applied to the outer opposite sides thereof so that the rim edges of the filter inlet can be easily assembled into said groove.

4. In a suction cleaner a filter assembly adapted to be connected to an air discharge conduit including a tubular filter adapter means having its lower inlet end connected to said discharge conduit and forming a continuation thereof, the upper discharge end of said adapter means including a resilient flexible walled conduit, flange means projecting from the outer side of said resilient conduit adjacent the upper end thereof forming a narrow groove adapted to seat and grip the opposite sides of the rim of an air inlet opening formed in the wall of a paper filter bag with the surfaces of the groove engaging the rim of the air inlet opening, a throw-away paper filter bag having an inlet opening through the wall thereof corresponding in size and shape with the base of said narrow groove, and air pervious means forming an appearance covering for enclosing said filter bag and filter adapter means and having an opening through the lower end thereof to receive said suction cleaner air discharge conduit.

5. A combined self-expanding filter clamp and filter adapter for use on an upright suction cleaner comprising, an elongated tubular conduit made of flexible resilient material which resists but permits collapse of the conduit when pressure is applied radially inward from the opposite sides thereof, said conduit also being readily flexible to a limited extent lengthwise thereof, a plurality of closely spaced flanges projecting from the outer wall of said conduit adjacent the outlet end thereof and arranged to form a narrow filter seating groove adapted to receive and seat in an airtight manner the rim edges of an inlet opening formed through the wall of a paper filter bag with the facing edges of said flanges seated against the inner and outer rim faces of the filter inlet opening, said adapter being assembled to and disassembled from a filter bag inlet after at least one of the side walls of said conduit adjacent said flanges is collapsed inwardly toward the axis of said conduit to reduce the cross sectional area thereof.

6. A combined self-expanding filter clamp and filter adapter as defined in claim 5 wherein said filter seating groove lies in a plane at an angle to the axis of said flexible walled conduit whereby the side wall of a filter bag assembled thereto will lie beside the main body portion of said conduit.

7. A combined self-expanding filter clamp and filter adapter as defined in claim 5 wherein the outlet end of said tubular conduit has an arcuate bend of limited extent whereby said outlet end lies to one side of the main body of the conduit with said filter seating groove lying in a plane closely beside one side of the main body of said conduit.

8. A combined self-expanding filter clamp and filter adapter as defined in claim 7 wherein the base of said filter seating groove is generally elliptical in shape and requires a similarly shaped inlet opening in a filter bag for an airtight fit therewith.

References Cited in the file of this patent

UNITED STATES PATENTS

| | | |
|---|---|---|
| 2,015,772 | Wassall | Oct. 1, 1935 |
| 2,123,914 | Replogle | July 19, 1938 |
| 2,674,340 | Vance | Apr. 6, 1954 |

FOREIGN PATENTS

| | | |
|---|---|---|
| 20,722 | Great Britain | Sept. 11, 1913 |
| 447,299 | Great Britain | May 15, 1936 |